(12) United States Patent
Praszczalek

(10) Patent No.: US 12,126,627 B2
(45) Date of Patent: Oct. 22, 2024

(54) SYSTEMS AND METHODS FOR PREVENTING FRAUD WITH INTUITIVE, KNOWLEDGE-BASED GEOLOCATION SERVICES

(71) Applicant: MASTERCARD INTERNATIONAL INCORPORATED, Purchase, NY (US)

(72) Inventor: Przemek Praszczalek, Cypress, TX (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 288 days.

(21) Appl. No.: 17/558,526

(22) Filed: Dec. 21, 2021

(65) Prior Publication Data

US 2023/0198999 A1    Jun. 22, 2023

(51) Int. Cl.
*H04L 9/40* (2022.01)
(52) U.S. Cl.
CPC .......... *H04L 63/107* (2013.01); *H04L 63/083* (2013.01)
(58) Field of Classification Search
CPC ..... H04L 63/083; H04L 63/107; H04W 12/06
See application file for complete search history.

(56) References Cited

U.S. PATENT DOCUMENTS 9,690,972 B1 *  6/2017  Chau ................... H04L 63/0861
9,797,985 B2   10/2017  Tseng et al.
10,021,108 B2 *  7/2018  Mankovskii .......... H04L 63/105
10,148,668 B2   12/2018  Bandi et al.
10,158,493 B2 * 12/2018  Cesar Bitar ......... H04L 63/0823
10,708,278 B1   7/2020  Cuan et al.
2002/0174344 A1 * 11/2002  Ting .................... H04L 63/1466
                                                              713/185

(Continued)

OTHER PUBLICATIONS

International Search Report and Written Opinion issued in corresponding International Application No. PCT/US2022/049184; dated Feb. 16, 2023.

(Continued)

*Primary Examiner* — Mohammad A Siddiqi
(74) *Attorney, Agent, or Firm* — Pillsbury Winthrop Shaw Pittman LLP

(57) ABSTRACT

The disclosure herein relates to methods, apparatuses, and systems for improving authentication using geolocation data. In some examples, a user may be authenticated by comparing user provided geolocation data with a predetermined geolocation. The user input may be made on a map interface. In some examples, the user may be authenticated by comparing two geolocations together. A slope of a line intersecting the user inputted geolocation and the pre-defined primary geolocation may be computed. If the calculated slope value corresponds to an initial slope value, then the answer may be deemed valid. In some examples, the authentication system may authenticate the user by comparing three geolocations together. An angle between two lines may be computed, where each line is formed by intersecting one of two geolocation answers and an intersecting the primary geolocation. If the computed angle corresponds with a stored secret angle, the answer may be deemed valid.

18 Claims, 11 Drawing Sheets

(56) References Cited

U.S. PATENT DOCUMENTS

| | | | | |
|---|---|---|---|---|
| 2006/0023921 | A1* | 2/2006 | Saitoh | G06V 40/1347 |
| | | | | 382/115 |
| 2006/0165264 | A1* | 7/2006 | Saitoh | G06V 40/103 |
| | | | | 382/115 |
| 2008/0299989 | A1* | 12/2008 | King | H04W 4/029 |
| | | | | 342/357.55 |
| 2016/0065558 | A1* | 3/2016 | Suresh | G06F 21/32 |
| | | | | 726/7 |
| 2018/0262500 | A1* | 9/2018 | De Kievit | H04W 12/088 |
| 2019/0068382 | A1* | 2/2019 | Theodore | H04W 12/06 |
| 2021/0357907 | A1* | 11/2021 | Shpak | H04W 4/025 |

OTHER PUBLICATIONS

Meng Weizhi et al "TMGMap: Designing Touch Movement-Based. Geographical Password Authentication on Smartphones", Sep. 6, 2018 (Sep. 6, 2018); SAT2015 18th International Conference, Austin, TX,USA, pp. 373-390 [retrieved on Sep. 6, 2018].

Shah Syed W et al: "Recent Trends in User Authentication—A Survey" IEEE Access, vol. 7, pp. 112505-112519 [retrieved on Aug. 21, 2019].

Macrae Bren et al: "An Exploration of Geographic Authentication Schemes". IEEE Transactions on Infohmation Forensics and Security, IEEE, USA; vol. 11, No. 9, Sep. 1, 2016 (Sep. 1, 2016), pp. 1997-2012, [retrieved on Jun. 28, 2016].

* cited by examiner

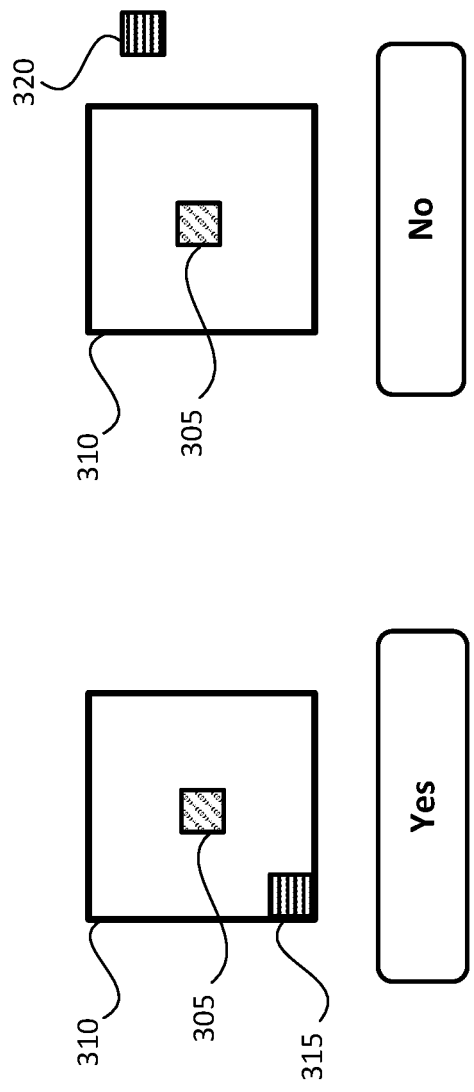

SYSTEMS AND METHODS FOR PREVENTING FRAUD WITH INTUITIVE, KNOWLEDGE-BASED GEOLOCATION SERVICES

BACKGROUND

Authenticating a user is an important aspect to providing confidence and security in various contexts. In an online setting, authentication methods may rely on a user answering one or more "security questions" that must match a pre-defined answer. Examples of security questions may include "What is the name of your first pet?" or "What city were you born in?" While presumably these security questions are unique to the user, they may be susceptible to various types of attacks. For example, answers to some of these security questions may be discovered through online searches and through social media. In other examples, the answers to these security questions may be persistently stored in a way that is susceptible to theft. Therefore, these types of "security questions" and other authentication methods may become less secure as a user's Internet footprint tends to grow over time and as malicious threats continues to rise. Thus, the security of authentication systems that rely on these types of security questions and other authentication methods may be vulnerable to attack.

BRIEF DESCRIPTION OF THE DRAWINGS

Features of the present disclosure may be illustrated by way of example and not limited in the following figure(s), in which like numerals indicate like elements, in which:

FIG. 3 illustrates an example of authentication logic for the authentication system in which a single precise geolocation is relied upon for authenticating a user;

DETAILED DESCRIPTION

Figure 1:
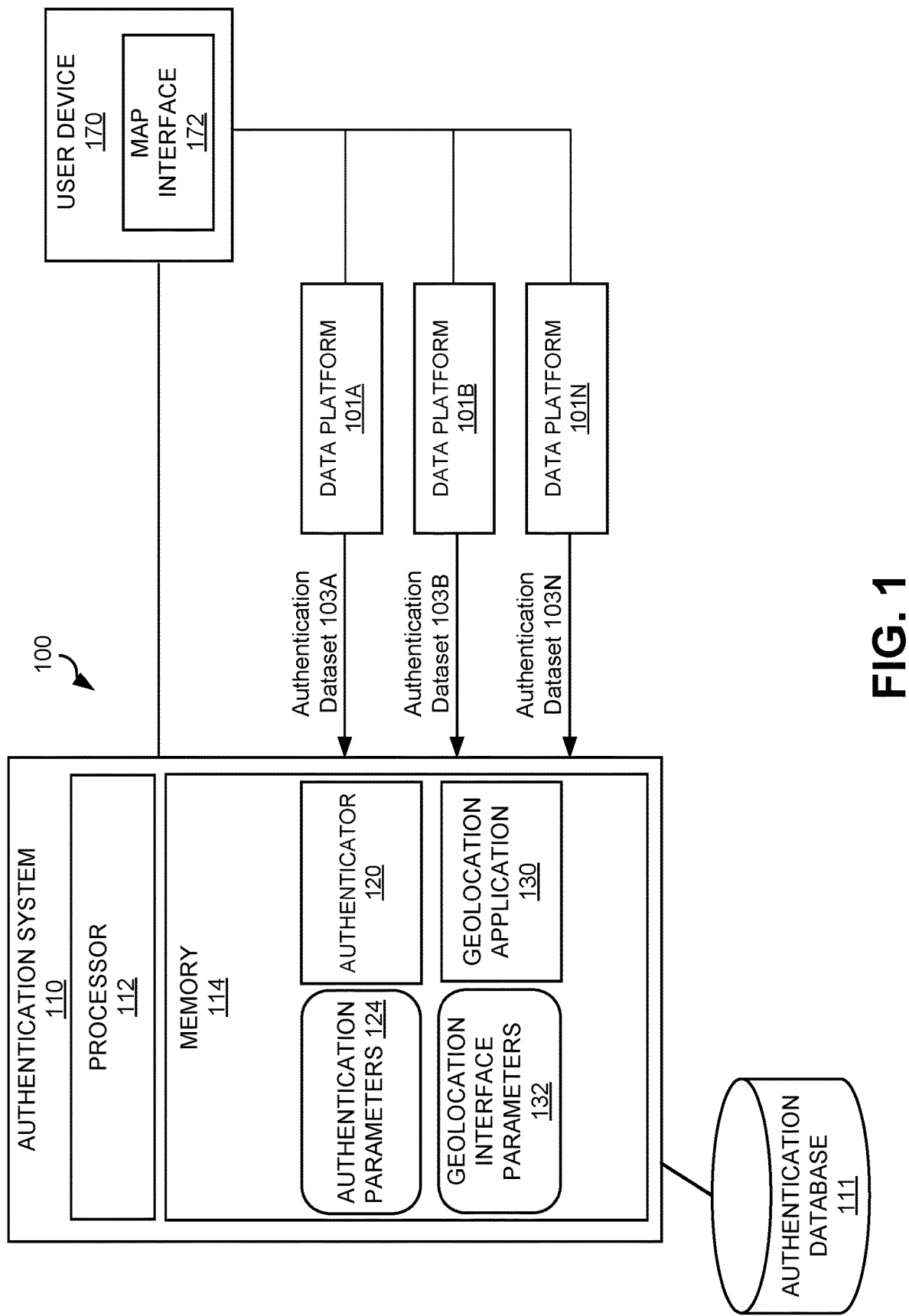
FIG. 1 illustrates an example of a system environment of authenticating a user based on geolocation data.

The disclosure relates to methods, apparatuses, and systems of improving authentication systems that authenticate a user. For example, the authentication system may be improved to verify user-defined geolocation data that is computationally generated using a geocoding scheme based on user input that has been previously specified by the user as a shared secret. The authentication system may use the geocoding scheme to compute verification data to generate an authentication result, indicating whether or not the user has been authenticated. In some examples, the user-defined geolocation data may include geocoded data that is computationally generated using a latitude and longitude coordinate scheme. In some examples, the geocoded data based on the latitude and longitude coordinate scheme may be further encoded using a geocoding scheme that converts latitude and longitude coordinates into an obfuscated identifier that represent the latitude and longitude coordinates. Whichever geocoding scheme or combination of geocoding scheme is used, the authentication system may authenticate the user based on the user-defined geolocation data in various ways.

In some examples, the authentication system may authenticate a user by comparing a user input of a geolocation with a predetermined, precise geolocation. The user input may be based on an authentication question prompt whose correct answer should be the predetermined, precise geolocation. The user input selection may be made on a graphical map interface or application using a consistent map projection (that is the same or similar type of map projection used to receive the original geolocation). The authentication system may allow for an acceptable range of answers surrounding the precise geolocation, such as a two-dimensional square surrounding the precise geolocation. If the user provides a geolocation answer that falls within the acceptable range around the predetermined, precise geolocation, then the answer may be deemed valid.

In some examples, the authentication system may authenticate the user by comparing two geolocations together. The authentication system may utilize a zero knowledge proof, meaning that the authentication system does not know one or more answers to the authentication questions. In zero knowledge proof examples, the authentication system may instead perform additional processing of the user's answers to derive authentication information that is based on the user's answer. For example, the authentication system may receive an answer from the user about a secret geolocation that the authentication system does not persistently store and retrieve for authentication. To verify whether the user provided an answer that corresponds to the secret geolocation, the authentication system may instead store or at least have knowledge of a computational value that relates the secret geolocation to a pre-defined primary geolocation. For example, the computational value may be a slope value of a line that intersects the secret geolocation and the pre-defined primary geolocation. The authentication system may then generate a slope of a line intersecting the user inputted geolocation and the pre-defined primary geolocation. If the generated slope value using the user input matches or is within an acceptable range of the initial slope value, then the answer may be deemed valid. In these examples, because the secret geolocation is not persistently stored and directly used for authentication, the secret geolocation may not be vulnerable to theft. In some examples, in order to compare the two geolocations together, the user may also be prompted to provide an answer to where the primary geolocation is, and the authentication system may not persistently store and may not otherwise have knowledge of the primary geolocation as well.

In some examples, the authentication system may authenticate the user by comparing at least three geolocations together. The authentication system may utilize another zero knowledge proof in this case, in that the authentication system may not persistently store or otherwise retrieve at least two secret geolocations. For example, the user may be prompted to provide, on a graphical map interface, two geolocations, in response to two different authentication questions. In some examples, the authentication system may store or receive a primary geolocation as the third geolocation, while in other examples, the authentication system may receive an answer for the primary geolocation as well. Rather than know the locations of the two secret geolocations, the authentication system may compute an angle between two lines, where each line is formed by intersecting one of the two geolocation answers and intersecting the primary geolocation. If the computed angle matches or falls within an acceptable range compared to a stored secret angle, the answer may be deemed valid. In some examples, the authentication system may also generate at least one of the slopes of one of the lines formed by intersecting the primary geolocation and one of the secret geolocations. This generated slope may be compared to a stored slope to further verify if the user's answers are deemed valid.

FIG. 1 illustrates an example of a system environment 100 of authenticating a user based on geolocation data, according to any of the examples provided herein. The system environment 100 may include one or more data platforms 101 (illustrated as data platforms 101A-N), an authentication system 110, a user device 170, and/or other components. At least some of the components of the system environment 100 may be connected to one another via a communication network, which may include the Internet, an intranet, a Personal Area Network, a LAN (Local Area Network), a WAN (Wide Area Network), a SAN (Storage Area Network), a MAN (Metropolitan Area Network), a wireless network, a cellular communications network, a Public Switched Telephone Network, and/or other network through which system environment 100 components may communicate.

A data platform 101 may refer to a computer system that provides services to a user. A data platform 101 may include various types of devices depending on its context. For example, in an electronic payment context, the data platform 101 may include an issuing bank device, an acquirer device, a merchant device (such as a device operating an electronic commerce site), and/or other device involved in a payment transaction. In a network security context, the data platform 101 may include a network firewall, a security monitoring platform, and/or other device involved in the security of a computer system.

In connection with providing its services, a data platform 101 may authenticate a user. To do so, the data platform 101 may obtain or generate an authentication data set 103. An authentication dataset set 103 may refer to data that includes data used in an authentication process, and in some cases may also include data for performing one or more services generated by or for the data platform 101. Examples of data in the authentication dataset 103 include geolocation values, zero knowledge proof information, and/or other information for user authentication described herein.

Each data platform 101 may provide a respective authentication dataset 103 to the authentication system 110. In some examples, each data platform 101 may provide a respective authentication dataset 103 in response to an authentication query, which may be initiated by a user. The authentication system 110 may perform an authentication verification of the user based on the received authentication dataset 103.

An authentication database 111 may be communicatively coupled to the authentication system 110 and store some or all of each authentication dataset 103 in association with an initiation of an authentication challenge intended to authenticate a user. In this manner, an authentication dataset 103 received from a data platform 101 may be accessed from the authentication database 111. In some cases, each authentication dataset 103 may be specific to a particular data platform 101. The authentication database 111 may persistently store for retrieval some or all of the authentication dataset 103. Persistent storage in this context refers to data that is able to be retrieved for later authentication. By contrast, in various examples described herein, some data described herein may not be persistently stored so as to improve security of this data.

The authentication system 110 may include one or more computing devices that authenticate a user based on an authentication dataset 103. For example, the one or more computing devices of the authentication system 110 may each include a processor 112, a memory 114, an authenticator 120, a geolocation application 130, authentication algorithm parameters 124, geolocation application parameters 132, and/or other components. The authenticator 120 and authentication algorithm parameters 124 may perform user authentication as described with respect to FIGS. 2A, 2B, and 3-9. The geolocation application 130 and geolocation application parameters 132 may be used to interact with the data platforms 101A-N and/or user device 170 to cause a map interface 172 to prompt for and receive user answers to authentication questions.

The processor 112 may be a semiconductor-based microprocessor, a central processing unit (CPU), an application specific integrated circuit (ASIC), a field-programmable gate array (FPGA), and/or other suitable hardware device. Although the authentication system 110 has been depicted as including a single processor 112, it should be understood that the authentication system 110 may include multiple processors, multiple cores, or the like. The memory 114 may be an electronic, magnetic, optical, or other physical storage device that includes or stores executable instructions. The memory 114 may be, for example, Random Access memory (RAM), an Electrically Erasable Programmable Read-Only Memory (EEPROM), a storage device, an optical disc, and the like. The memory 114 may be a non-transitory machine-readable storage medium, where the term "non-transitory" does not encompass transitory propagating signals.

The authenticator 120, geolocation application 130 may each be implemented as instructions that program the processor 112. Alternatively, or additionally, the authenticator 120 and geolocation application 130 may each be implemented in hardware.

Figure 2A:
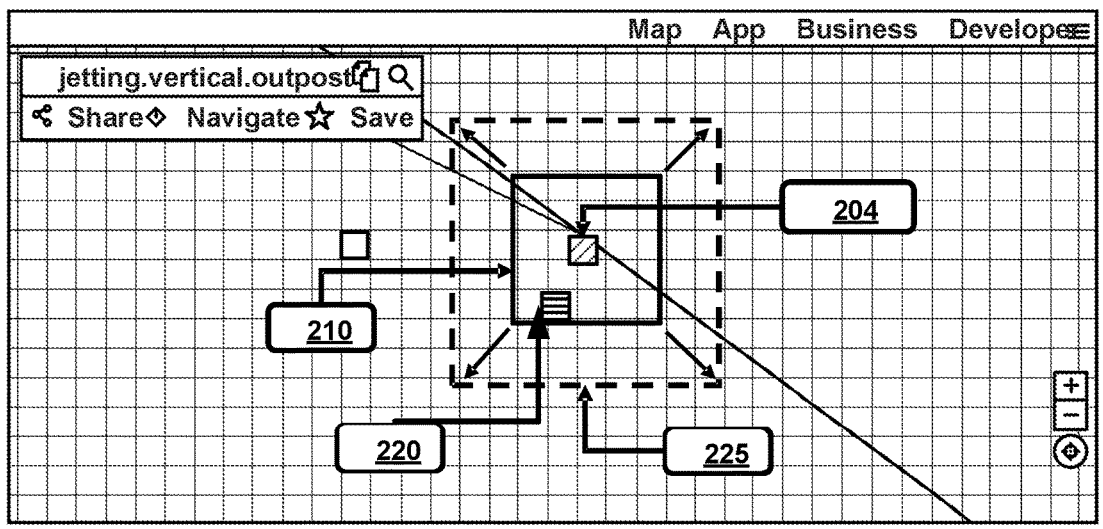
FIG. 2A illustrates an example of a map interface that includes a precise geolocation that may be used by an authentication system.

Reference will now be made to various examples of map interfaces 172 through which the authentication system 110 may receive user inputs from which authentication dataset 103 is computationally generated. For example, FIG. 2A illustrates a map interface 172A that includes a geolocation 204 that may be used by the authentication system 110 for user authentication. For instance, the data platform 101 may initiate user authentication to authenticate a user that has provided user identifying information, such as a username. The user authentication may be conducted by the authentication system 110 (such as by the authenticator 120). It should be noted, however, that some or all of the user authentication described herein with respect to the authentication system 110 may be executed by the data platform 101 and/or the user device 170. Likewise, some or all of the user authentication described herein with respect to the data platform 101 may be executed by the authentication system 110. The authentication system 110 may include processing to launch the map application in order to interface with the user. The user may provide user identification (such as a username), prompting the data platform 101 to initiate user authentication through the authentication system 110. The authentication system 110 may then present the authentication query to the user, and cause the map interface 172A to display and be ready to accept a user input as an answer to the authentication query. The map interface 172A may receive an input such as a touch input on a touch display, a selection such as a mouse click, or other input on a map displayed via the map interface 172A. The map interface 172A may computationally determine that the input corresponds to a response geolocation 220 as an answer to the authentication question. For example, the map interface 172A may convert a selected pixel position corresponding to the input on the map display with latitude/longitude coordinates for the response geolocation 220.

In some examples, a geocoding scheme may be used to encode the geolocation answer using a unique descriptor for a geolocation, such as entering a combination of words that are uniquely mapped to an area. As another example, the geocoding scheme may involve converting GPS coordinates into a unique string of letters and numbers. The authentication system may access a geolocation application program interface (API) that converts the geolocation answer into one of these unique descriptors.

To set up the authentication query, the user may also be prompted to enter the question that is meant to lead one to enter the geographic location 204, in a registration process. Rather than submit questions that may be more readily searchable online, such as "What is your mother's maiden name?" or "What is your first pet's name?" the disclosure herein allows the user to enter questions that are based on geolocations that are prompted by more esoteric questions or user experiences. For example, the user may now be able to set up questions such as, "Where is the street vendor in Bangkok where I used to get Thai tea?" Other example questions may be, "Where are my two favorite places for empanadas in NYC?" or "What place did I stop before I proposed?" or "Where was I when I heard the news about 9/11 attacks?" Answers to these types of questions may be more succinctly answered by pointing to a geographic location, rather than typing in an answer that must match a precise string of characters, or is a name of an actual place/location/business and is more easily obtainable by searching online for information about the user. As part of the registration process, the user may enter sufficient identification information about him or herself, and the authentication question and precise geolocation will be stored in association with the user's identification credentials. In some examples, the same geocoding scheme used to convert a geolocation answer in response to an authentication query may also be used to convert the true, precise geolocation that is entered during the user's registration process.

To allow for more specific questions that rely on geolocations as the answer, but still provide flexibility that might otherwise frustrate a user, in some examples, the authentication system may include a geographic range of acceptable geolocations. Still referring to FIG. 1, while the geolocation 204 represents an intended answer geolocation, an acceptable range 210, surrounding the geolocation 204, may be designated as the area in which a user input is accepted as a valid answer. For example, the area of precise geolocation 204 may represent a 3 meter×3 meter square on the Earth, and the acceptable range 210 may include a 5×5 square (15 meters×15 meters). One example of a precise geolocation represented as a square includes the representation provided used by WHAT3WORDS. In some examples, the geolocation 204 may be at the center (or other region) of the acceptable range 210. Thus, if a user inputs response geolocation 220 in response to an authentication question, because the response geolocation 220 is within the acceptable range 210, the authentication system 110 may determine that the response geolocation 220 is an acceptable answer.

In some examples, the authentication system 110 may calibrate the acceptable range 210. For example, the authentication system 110 may calibrate the acceptable range 210 by expanding or reducing the acceptable range 210 in one or more dimensions. As illustrated, for example, the authentication system 110 may expand the acceptable range 210 in both dimensions to the range 225. In these examples, the authentication system 110 may calibrate the acceptable range 210 based on a context of the user authentication. For example, if the account to be authenticated is tied to a paid subscription, a user that pays more for their subscription may require a reduced acceptable range 210. The user that pays for a more expensive subscription would therefore require a more stringent authentication with less room for error in inputting the response geolocation 220. As another example, any of the authentication processes described herein may be initiated in the context of a payment transaction. In this example, the acceptable range 210 may be calibrated based on the payment amount for the payment transaction. If the payment amount is higher, then the acceptable range 210 may be reduced compared to lower payment amounts. In some examples, the authentication system 110 may use a payment amount threshold, above which a first acceptable range 210 is used and below which a second acceptable range 210 is used. In some examples, the authentication system 110 may use ranges of payment amounts, in which an acceptable range 210 is assigned for each range. In this way, the acceptable range 210 of geolocation answers may demand a higher or lower level of accuracy, depending on other factors about the user's transaction.

Figure 2B:
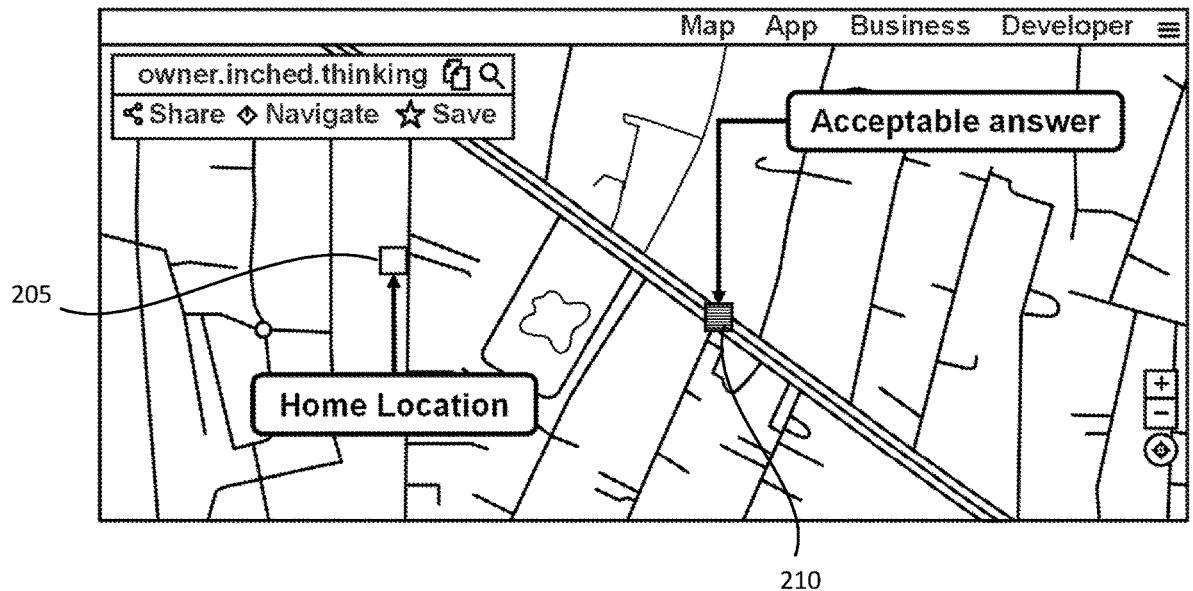
FIG. 2B illustrates another display provided by the example map interface for answering an authentication question.

Reference will now be made to FIG. 2B, which illustrates another display provided by the example map interface 172B for answering an authentication question. In this example, a question may be posed to the user through the authentication system. In some examples, to enable a quicker authentication, a user screen on a user device may be shown that includes a starting geolocation, such as home geolocation 205, that is within some proximity to the acceptable range 210. In this example, the graphical display may start out by already showing the starting home geolocation 205 and the acceptable range 210. In other examples, a graphical display may start from the home geolocation 205, while the acceptable range 210 may exist off the screen, and even very far away. In other examples, the graphical display may start from a very zoomed-out view, such as covering hundreds of miles.

In some examples, the manner in which the answer to the authentication question may be received may vary. A user may provide a geolocation input in a map application, that represents a geographic location. This input may be converted to a coordinate system geolocation, such as latitude and longitude. In other examples, the answer may be provided in the form of a proxy mapping, such as by entering a combination of three words that uniquely defines a fixed geolocation on the globe. As another example, a code that represents a specific set of coordinates may be inputted as an answer. The code may act as a substitute where no address exists for a desired geolocation.

Referring to FIG. 3, illustration 300 summarizes authentication logic for the authentication system examples in which a single precise geolocation is relied upon for authenticating a user. Consistent to what is described above, according to some examples, the authentication question may ask for a geographic location, which may be based on more specific memories that somebody posing as the user should not know. The precise geolocation 305 may be stored by the authentication system. The authentication system may allow for a range of answers within an acceptable range 310 surrounding the precise geolocation 305 to represent valid answers, while any selected geolocation falling outside such boundary may be deemed invalid answers. The authentication system may receive a geographic location 315 as the answer to the authentication question. The authentication system may determine that answer 315 is within the acceptable range 310 surrounding the precise geolocation 305, and thus may determine that the answer is valid. On the other hand, if the authentication system receives an input, such as a response geolocation 320, the authentication system may determine that the response geolocation 320 falls outside of the acceptable range 310, and therefore may process it as an invalid answer.

Figure 4:
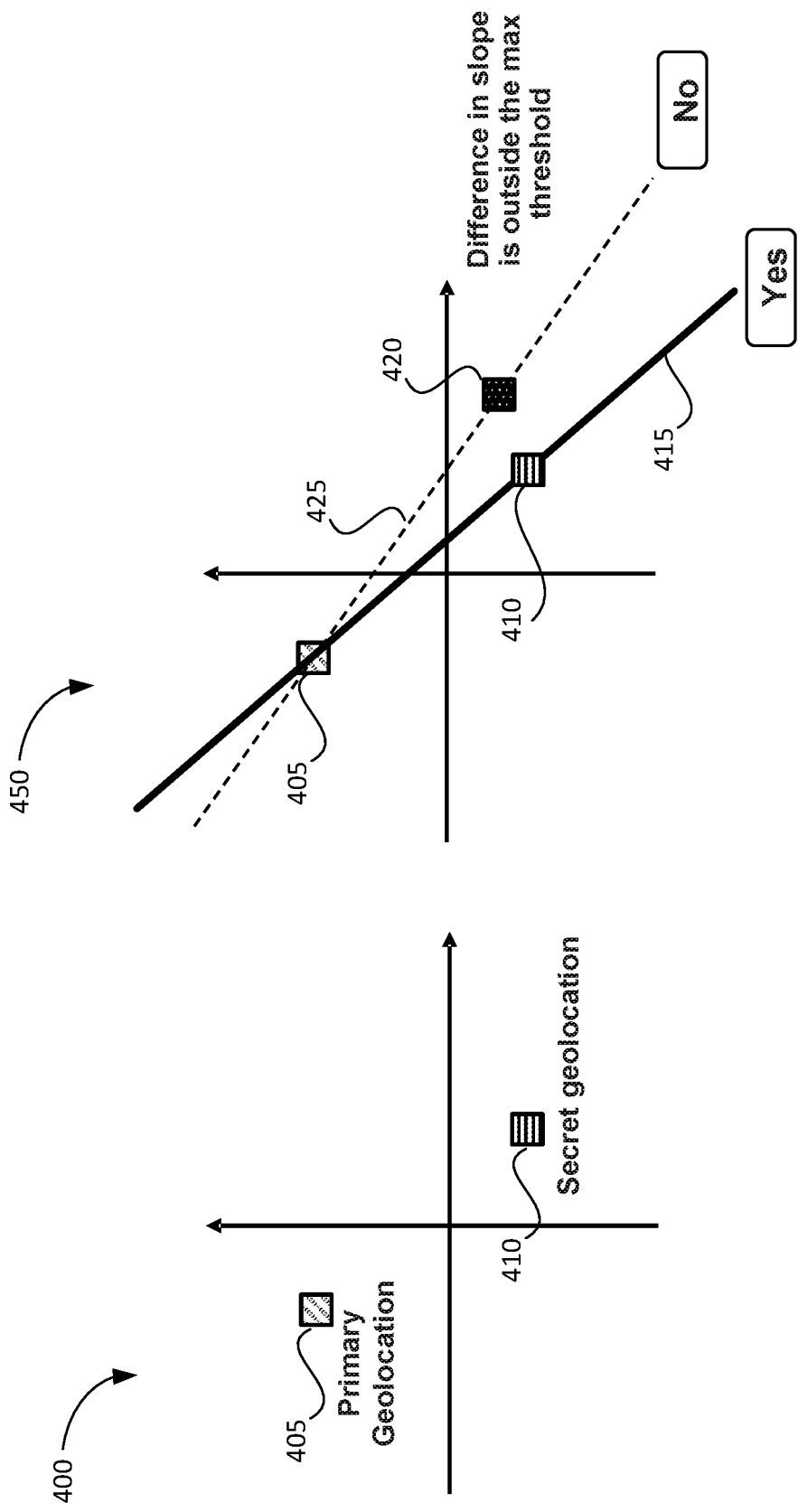
FIG. 4 illustrates an example for authenticating a user utilizing a zero knowledge proof, where a secret geolocation to answer a challenge question is not persistently stored in permanent storage.

Referring to FIG. 4, in some examples, authenticating a user may utilize a zero knowledge proof, meaning that the authentication system may be able to authenticate the user while possessing incomplete information. For example, the authentication system may not store the correct answer to an authentication question, but instead may store other pieces of different information that may be combined with the correct answer to the authentication question in order to authenticate the user. Referring to illustration 400 as an example, shown is a primary geolocation 405 and a secret geolocation 410, on some coordinate system. In some examples, the authentication system may store just the primary geolocation 405 and may not store the secret geolocation 410. The authentication question may be directed to prompt the user to answer with the secret geolocation 410, however. To authenticate the user based on an answer that the authentication system cannot verify, the authentication system may instead rely on a relationship between the primary geolocation 405 and the secret geolocation 410. For example, the authentication system may instead store a computational value, such as a calculated slope value of a line 415 formed intersecting the primary geolocation 405 and the secret geolocation 410, as shown in illustration 450. The primary geolocation 405 and secret geolocation 410 may be stored as two-dimensional coordinates, thus enabling a slope value to be calculated between them using readily known algebra techniques. Although, the secret geolocation 410 may be only temporarily persistently stored in order to compute the slope value. The secret geolocation 410 may then be ultimately deleted once it is no longer needed.

Thus, in some examples, the authentication system may store the primary geolocation 405 coordinates and a slope value 415, while not storing the secret geolocation 410 coordinates, even though the secret geolocation 410 would be the answer to the authentication question. To authenticate the user, the authentication system would then receive a geolocation answer and compute the slope value between the received answer and the stored primary geolocation. If the computed slope matches the stored slope value, then the received geolocation answer may be deemed valid.

In some examples, the calculated slope may need to be within a threshold range of the stored slope value. For example, the user may enter geolocation 420 in response to the authentication question. Therefore, the calculated slope would be based on the line 425 drawn between the primary geolocation 405 and the entered geolocation 420. If this calculated slope is too different from the stored slope value, such that this calculated slope falls outside an acceptable range, then the answer may be deemed invalid, even though the authentication system does not know what the secret geolocation 410 is. As an example, the slope value between the primary geolocation 405 and the secret geolocation 410 may be 0.10229595. Again, the authentication system may not store the secret geolocation 410 but instead may store this slope value, along with the primary geolocation 405. The user may enter a geolocation in response to the authentication question, and that geolocation 420 may be 100 feet away from the intended secret geolocation 410. The calculated slope value between the user's answer 420 and the primary geolocation 405 may be calculated to be 0.102421349, as an example. The authentication system may deem valid answers that are +/−0.001 of the stored slope value. Here, the difference between the calculated slope value 425 and the stored slope value 410 is −0.000125398, which is within the acceptable range. Therefore, the authentication system may determine that the user's answer was valid. In some examples, similar to what is described above, the acceptable threshold range may vary based on one or more factors, such as how valuable the user's account is or how valuable the user's transaction may be.

In some examples, the authentication system may also not store the primary geolocation 405 either. The authentication system may store only a slope value, and may require two geolocations answers: an answer to the authentication question that should lead to the secret geolocation 410, as well as requiring the user to remember what the primary geolocation 405 is. The authentication system may then compute a slope between the two values, and determine if the calculated slope matches or falls within an acceptable range of the stored slope answer.

Figure 5:
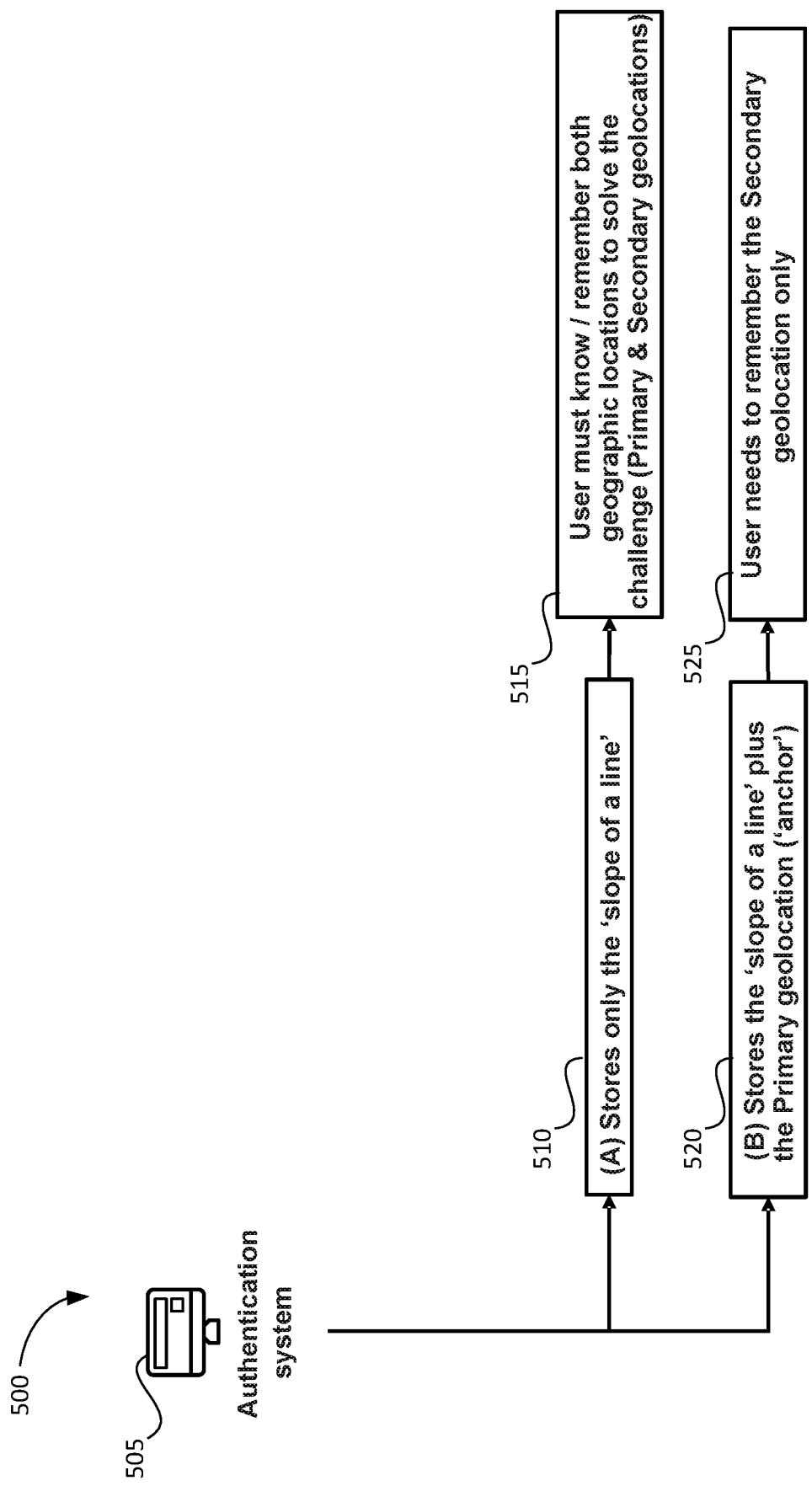
FIG. 5 illustrates an example logical flow that summarizes the zero knowledge proofs described in FIG. 4.

Referring to FIG. 5, illustration 500 shows an example logical flow that summarizes the zero knowledge proofs described in FIG. 4. Authentication system 505 may provide an authentication process in which the authentication system 505 does not store the answer to an authentication question, and therefore can provide an additional layer of security when verifying the user. Instead, the authentication system 505 may store information that is indirectly related to an answer the user may provide. For example, at block 510 where, in the instances where the authentication system 505 stores only the slope of a line, at block 515, the user may be prompted to provide both the primary geolocation and the secret geolocation that is the answer to an authentication question. The authentication system 505 may then compute a slope value out of the two provided answers, and will determine if the computed slope value matches the store slope, or at least falls within an acceptable range. On the other hand, at block 520, if the authentication system stores both the slope of a line and the primary geolocation, but still does not store the secret geolocation, at block 525, the user may be prompted to enter just the secret or secondary geolocation. The computed slope value may then be based on the answer the user provides, plus the additional information that the authentication system has stored.

Figure 6:
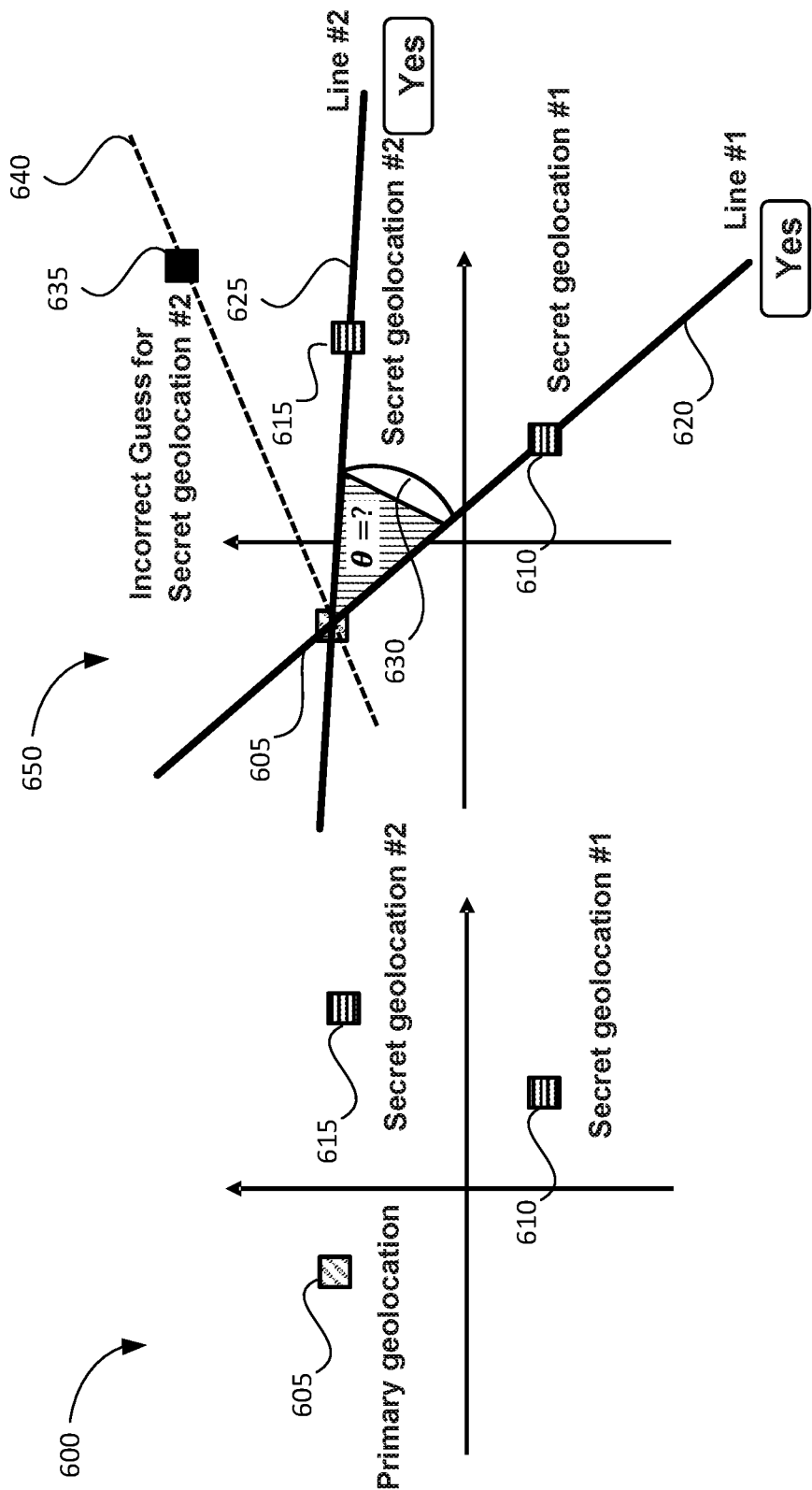
FIG. 6 illustrates an authentication system utilizing a zero knowledge proof involving multiple secret geolocations in order to authenticate a user.

Referring to FIG. 6, in some examples, an authentication system may utilize a zero knowledge proof involving multiple secret geolocations in order to authenticate a user. As an example, illustration 600 shows a two-dimensional graph with a primary geolocation 605 and two secret geolocations 610 and 615. The zero knowledge proof in this case may involve the authentication system not storing either of secret geolocation #1 (610) or secret geolocation #2 (615). In some examples, the primary geolocation 605 may be stored, while in other cases the primary geolocation 605 would not be persistently stored. The authentication questions presented would require the user to answer questions that should lead to secret geolocations #1 (610) and #2 (615) as answers, even though the authentication system would not know what those answers are.

In order to relate the two secret geolocation answers and to verify the user, as shown in illustration 650, the authentication system may instead store an angle 630 (which may be stored as a secret), which is often referred to as θ (theta). Angle 630 may first be calculated by finding both the line #1 (620) that intersects the secret geolocation #1 (610) and the primary geolocation 605, and the line #2 (625) that intersects the secret geolocation #2 (615) and the primary geolocation 605. Using known trigonometry equations, the angle 630 may be calculated. For example, by knowing the slopes, $m_1$ and $m_2$, of the two intersecting lines 620 and 625, the angle θ (630) may be derived according to equation (1):

$$\tan\theta = \left|\frac{m_2 - m_1}{1 + m_1 m_2}\right|$$

Angle 630 may then be stored by the authentication system, while the secret geolocations #1 (610) and #2 (615) would not be persistently stored. If the secret geolocations #1 (610) and #2 (615) would need to be temporarily persistently stored in order to compute the lines intersecting these geolocations, then the temporary storage would ultimately be deleted after they are no longer needed.

To verify an authentication challenge in this example, where the authentication challenge includes questions about both secret geolocations #1 (610) and #2 (615), the authentication system would receive the two answers regarding the secret geolocations from a user. The authentication system may also receive an answer as to where the primary geolocation 605 is, according to some examples. The authentication system may then compute the two lines from each answer to the secret geolocation questions that intersect the answer to the primary geolocation question. The authentication system may then use the slopes of those two lines to compute the secret angle. If that computed angle matches the stored angle 630, or falls within an acceptable range, the answer is validated.

As shown in illustration 650, a user may provide an input 635 as the answer to the question of where is secret geolocation #2 (615). A line 640 may be calculated using the primary geolocation 605 as the other point in the line. In this example, if the user entered a geolocation that matches the secret geolocation 610, then the secret angle may be computed using lines 640 and 620. The difference between the calculated angle and the angle 630 may be computed. If the difference is within a predetermined threshold, the answer may be deemed valid. On the other hand, if the different is greater than the predetermined threshold, the answer would be deemed invalid. In some examples, similar to what is described above, the acceptable threshold range for the difference between the calculated angle and the secret angle may vary, based on one or more factors, such as how valuable the user's account is or how valuable the user's transaction may be.

In some examples, the authentication system may also not store the primary geolocation 605, either. The user would be required to enter answers for all three geolocations, and the authentication may still perform the same types of calculations described with respect to FIG. 6.

Figure 7:
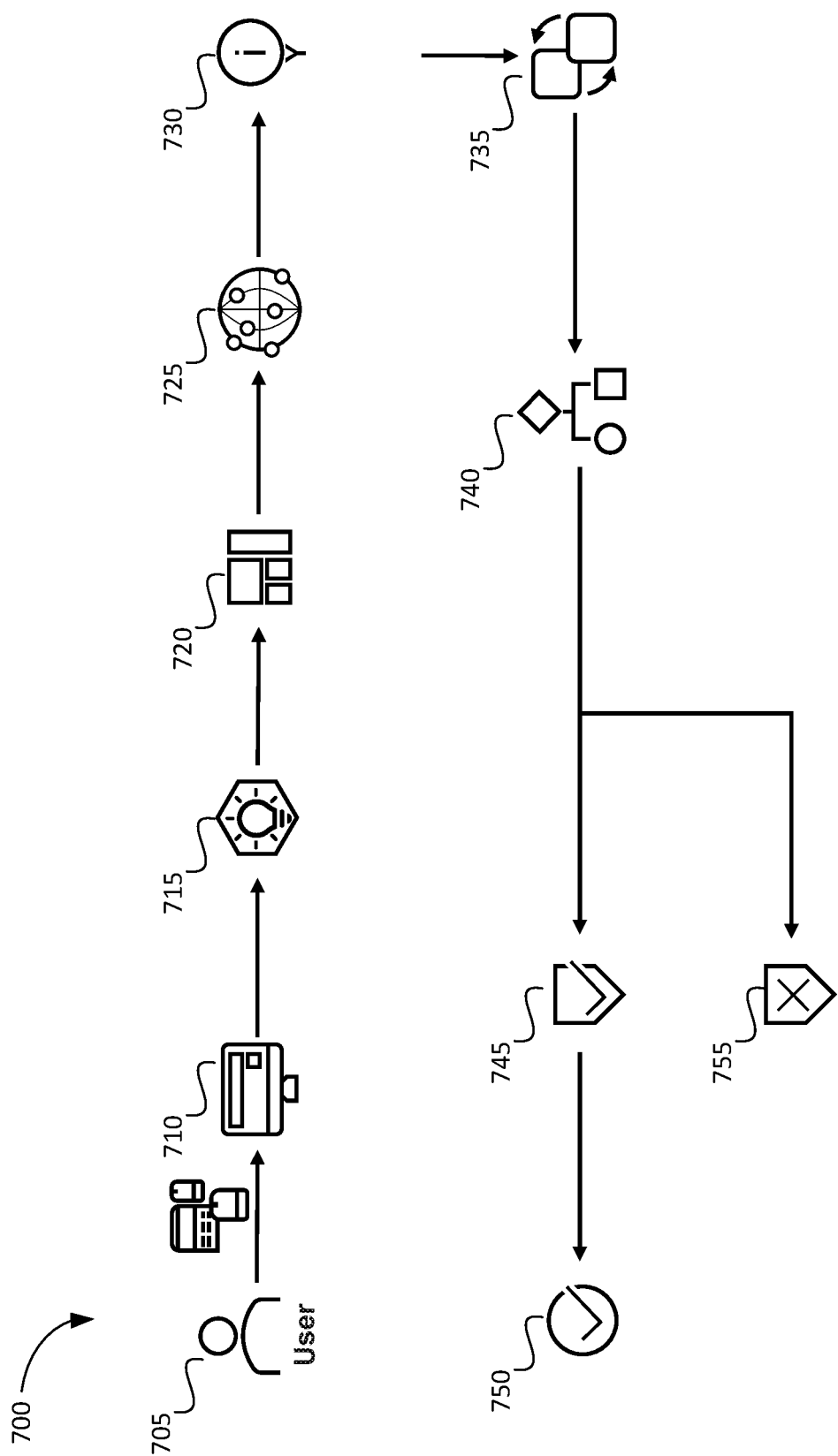
FIG. 7 illustrates an example flow diagram of an example methodology for setting up and conducting an authentication challenge to match a precise geolocation.

Referring to FIG. 7, illustration 700 shows an example flow diagram of an example methodology for setting up and conducting an authentication challenge to match a precise geolocation. This methodology may be consistent with the examples described in relation to FIGS. 1-3. Here, a user 705 may access an application 710 that provides an authentication verification according to the present disclosure. The application 710 may include services that the user wants to access or utilize, such as an interface to conduct financial transactions or make purchases. Before engaging in the functionality that the user 705 wants to interact with, the authentication verification process described in FIGS. 1-3 may initiate. Through the application 710, the user at 715 may be prompted to create a challenge question whose answer is a geolocation and may be stored as a set of coordinates or some other unique geographic answer. This may occur when the user creates or updates an account through the application 710, for example. The question may be stored by the application 710, and in other cases may be stored by an authentication system located remotely. The answer to the challenge question may also be received, in the form of a set of coordinates, for example. The geolocation answer may be stored in the authentication system.

At 720, at a later time when the application 710 calls on the user to be authenticated, the authentication system may be accessed. At 725, the user 705 may be prompted to select a geolocation using a map interface or application. The geolocation selection may be based on the challenge question presented back to the user from 715. At 730, the user-selected geolocation from 725 may be accessed by the authentication system. The user-selected geolocation may be transmitted in the form of coordinates. In some examples, to make verification easier, at 735, the selected geolocation answer may be converted to a unique code, such as a combination of three words that uniquely maps to the selected geolocation.

In some examples, at 740, the authentication system may also access an increased geographic range surrounding the precise geolocation. The increased range may expand the acceptable range of geolocation answers by 10 feet×10 feet, for example. In some examples, the user may be prompted to pre-select how large the acceptable range of answers should be expanded to, while in other examples, the application 710 or the authentication system may set the range.

At 745 and 755, the authentication system may evaluate the received geolocation answer from the user at 725, and utilizing any change in the acceptable range at 740. If the provided answer is within the acceptable geographic range, at 750, the authentication system may validate the user and allow the service provided by application 710 to continue. On the other hand, if the answer is determined to fall outside of the acceptable range, at 755, the service provided by the application 710 may be halted, and the answer may be flagged.

Figure 8:
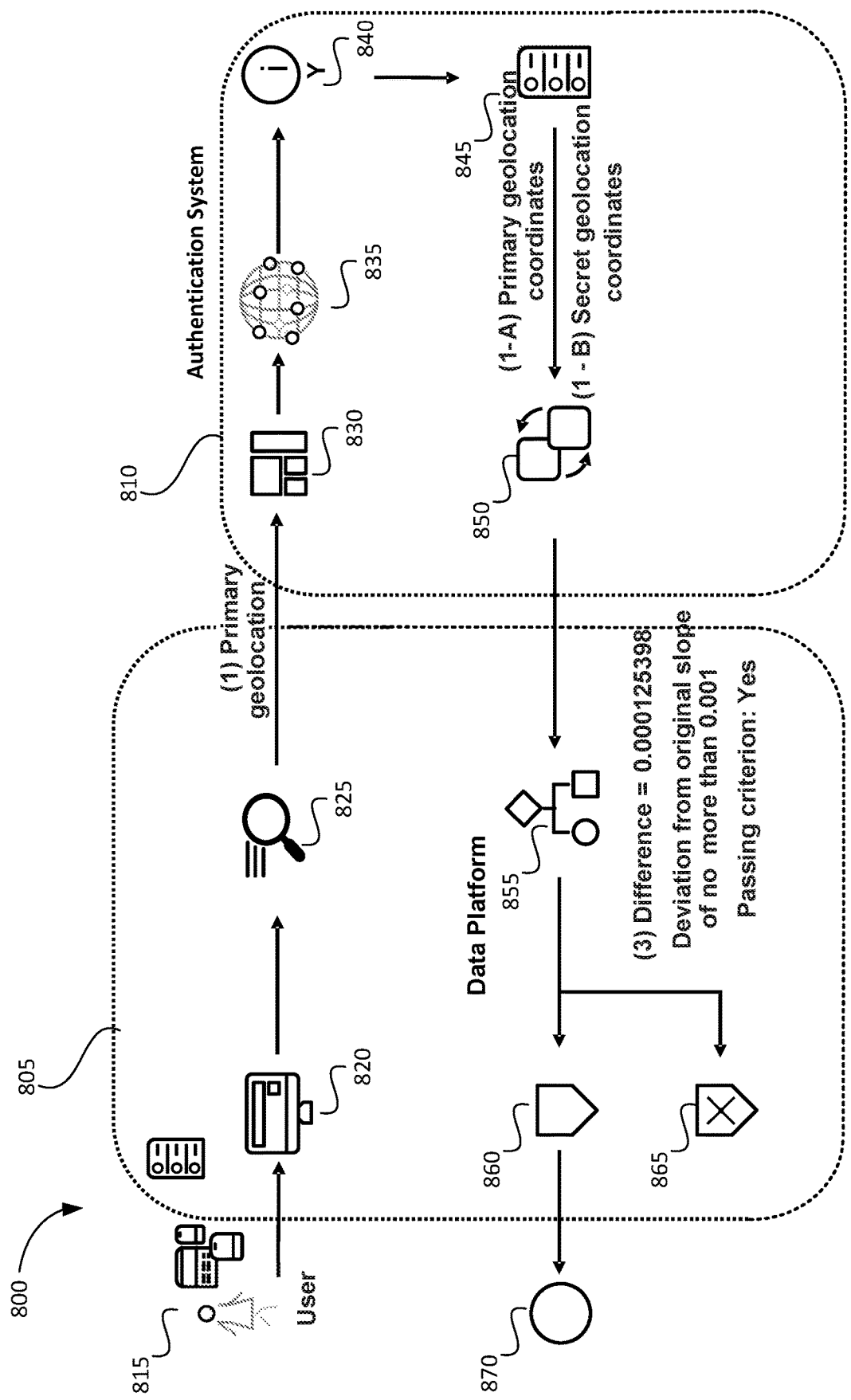
FIG. 8 illustrates an example flow diagram of an example methodology for conducting an authentication challenge using a zero knowledge proof. In this example, the zero knowledge proof involves a primary geolocation and a secret geolocation that the authentication system does not know.

Referring to FIG. 8, illustration 800 shows an example flow diagram of an example methodology for conducting an authentication challenge using a zero knowledge proof. In this example, the zero knowledge proof involves a primary geolocation and a secret geolocation that the authentication system does not know. This methodology may be consistent with the examples described in relation to FIGS. 4-5. This example describes the interactions between a data platform 805 and an authentication system 810. The data platform 805 may be consistent with the data platforms 101A-N described in FIG. 1. The authentication system 810 may be consistent with the authentication system 110 described in FIG. 1.

Here, the user 815 may access some data platform 805, through a user interface application 820. The data platform may provide a front-end service for the user 815, such as e-commerce, e-banking, or a point-of-sale verification. In some examples, the data platform 805 may store the primary geolocation and a slope of a line that would run through the primary geolocation and the secret geolocation, without storing the secret geolocation. In other examples, the authentication system 810 may be the one that stores these values. These values may have been set up previously with input from the user 815, when the user 815 initialized his or her account, for example. In this example, either the data platform 805 or the authentication system 810 may store a primary geolocation value of 52.229676 Lat, 21.012229 Long, and a slope of a line of −11.14895973.

At 825, the data platform 805 may activate the zero knowledge authentication challenge, through the user interface application 820. The user 815 may be prompted to input a geographic location on a map interface, as an answer to a challenge question that the user may have created earlier. The user 815 may be prompted to show where is the secret geolocation. At 830, the data platform 805 may call a geolocation service application that is part of the authentication system 810. The data platform 805 may also pass on the stored primary geolocation to the authentication system 810. At 835, the authentication system may provide data to cause the user interface application 820 to display a map interface through the geolocation service application. The geolocation service application may then receive a user input geolocation in response to the challenge question prompt. This user input may represent where the user 815 believes is the secret geolocation.

At 840, the authentication system 810 may receive a confirmation from the user 815 that locks in their answer, according to some examples. In addition, at 845, some examples may include a quality assurance check to ensure that the secret geolocation input provided by the user 815 at 835 utilized the same coordinate system as was used for the primary geolocation. For example, the authentication system 810 may verify that both coordinates were made using the same geographical Earth projection. At 850, by accessing both the primary geolocation coordinates and the secret geolocation coordinates, the authentication system 810 may compute a slope of the line that passes through both sets of coordinates. This value may be sent back to the data platform 805.

At 855, the data platform 805 may compute the difference between the received slope value calculated by the authentication system 810, and the stored slope value that was computed upon initial user registration. If the computed difference falls within some predetermined acceptable range, then at 860, the secret geolocation answer provided by the user 815 at 835 may be deemed valid. At 870, the service that the user 815 wants to access may be granted. If the difference is too large, then at 865, the secret geolocation answer provided by the user 815 at 835 may be deemed invalid, and the answer may be flagged and service halted. In this example, the computed difference between the two slope values is −0.000125398. If the acceptable range was set to be no greater than a deviation of 0.001, then in this case, the answer is deemed valid.

In this example, additional security is provided by the zero knowledge proof across the two different entities of the data platform 805 and the authentication system 810. Neither the data platform 805 nor the authentication system 810 has full information of the user's 815 primary geolocation and the secret geolocation. Not only does no entity know the exact answer to the secret geolocation, but only the authentication system 810 received the user input to the secret geolocation, while only the data platform knows the stored value of the slope of the line. In other examples, the authentication system 810 may possess more of the stored information, while the data platform 805 just acts more as a pass-through entity to receive inputs from both the user 815 and the authentication system 810.

Figure 9:
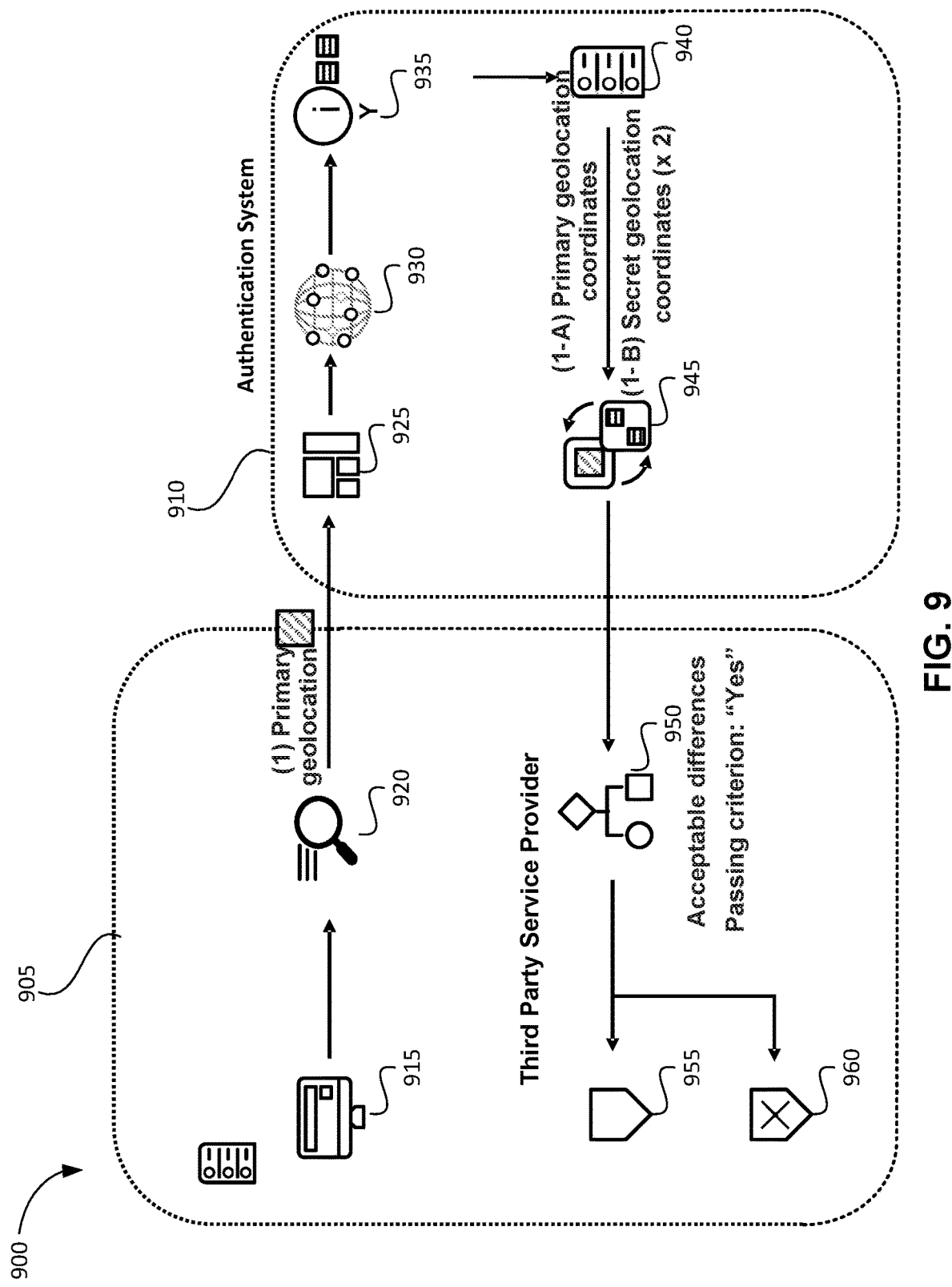
FIG. 9 illustrates an example flow diagram of another example methodology for conducting an authentication challenge using a different zero knowledge proof that involves a primary geolocation and two secret geolocations that the authentication system does not know.

Referring to FIG. 9, illustration 900 shows an example flow diagram of another example methodology for conducting an authentication challenge using a different zero knowledge proof. In this example, the zero knowledge proof involves a primary geolocation and two secret geolocations that the authentication system does not know. This methodology may be consistent with the examples described in relation to FIG. 6. In this illustration, the challenge questions and answers have already been entered by the user. This example explores more detail about how the authentication challenge may occur after it has been initiated. This example describes the interactions between a data platform 905 and an authentication system 910. The data platform 905 may be consistent with the data platforms 101A-N described in FIG. 1. The authentication system 910 may be consistent with the authentication system 110 described in FIG. 1.

Here, a user may initiate the authentication challenge by logging in at an application interface 915 of a data platform 905. As previously mentioned, the data platform 905 may provide a front-end service for the user, such as e-commerce, e-banking, or a point-of-sale verification. In some examples, the data platform 905 may store the primary geolocation, a slope of a first line that would run through the primary geolocation and a first secret geolocation, without storing the first secret geolocation, and a secret angle formed between the first line and a second line that runs through the primary geolocation and a second secret geolocation. In some examples, the data platform 905 stores the slope of the second line as well. In general, however, the data platform 905 does not store the first secret geolocation or the second secret geolocation. For example, the data platform 905 may store the primary geolocation equal to 52.229676 latitude, 21.012229 longitude; the slope of one line intersecting the primary geolocation and a first secret geolocation equal to 11.14895973; and the angle between the first line and a second line intersecting the primary geolocation and a second secret geolocation equal to 32.40849855. In some examples, the primary geolocation may not be stored, and the user would be required to remember that geolocation as well, prompted by an appropriate challenge question. In other examples, the authentication system 910 may be the one that stores the values that the data platform 905 described here would store.

At 920, the data platform 905 may prompt the user to answer the authentication challenge through the application interface 915. The user may be prompted with two different geolocation questions, prompting answers for the two different secret geolocations, for example. In some examples, the user may also be prompted to enter the primary geolocation.

At 925, the data platform 905 may pass along the primary geolocation to the authentication system 910, either entered by the user during the authentication challenge or stored previously. In other examples, the authentication system 910 may already have the primary geolocation, secret angle, and slope of one of the lines stored. A geolocation service application may be called or invoked, to provide a graphical interface for the user to answer the authentication challenge questions.

At 930, the authentication system 910 may receive user selections on the geolocation service application as answers to the authentication challenge questions. In this example, the authentication system 910 may receive at least two inputs from the user, representing answers for the first secret geolocation and the second secret geolocation. In some examples, the user may also enter the primary geolocation, prompted by an appropriate challenge question. At 935, the authentication system 910 may receive a confirmation from the user that locks in their answers, according to some examples. In addition, at 940, some examples may include a quality assurance check to ensure that the first and second secret geolocation inputs provided by the user at 930 utilized the same coordinate system as was used for the primary geolocation. For example, the authentication system 910 may verify that all three sets of coordinates were made using the same geographical Earth projection.

At 945, the authentication system 910 may compute a first slope of a line intersecting the primary geolocation and the user's answer to the first secret geolocation, and a second slope of a line intersecting the primary geolocation and the user's answer to the second secret geolocation. The authentication system 910 may then compute an angle formed by two lines having such slopes intersecting one another. Recognizing there are two angles formed by the two intersecting lines, the secret angle may be selected based on a rule that distinguishes the two angles. As some examples, the secret angle may always be the acute angle value, or the obtuse angle value, or may be the angle that always crosses the first and fourth quadrants in a cartesian plane, as opposed to the angle that would cross the first and second quadrants or the third and fourth quadrants. Alternatively, the secret angle value may be defined based on equation (1):

$$\tan\theta = \left|\frac{m_2 - m_1}{1 + m_1 m_2}\right|,$$

where θ is the secret angle, $m_1$ is the slope of the first line, and $m_2$ is the slope of the second line.

Using equation (1), the slope of the first line may be computed to be equal to −11.14883433, and the calculated angle may be computed to be equal to 32.40849855. The calculated angle may be transmitted back to the data platform 905. In some examples, the calculated slope of the first line may also be transmitted back to the data platform 905. Notice that throughout the operations by the authentication system 910, the actual geolocations of the first and second secret geolocations are never disclosed. In addition, the authentication system 910 is not given what the actual secret angle value is. Nevertheless, the disclosed process herein still allows for the authentication system 910 to conduct an authentication check properly.

At 950, the data platform 905 may receive the calculated angle θ and compare it to the stored secret angle θ. If the difference is within a predetermined threshold, then the data platform 905 may continue providing service to the user at 955. If the difference is not within the predetermined threshold, then the answer may be flagged and the service may be at least temporarily halted, at 960. In some examples, a second check may be performed against the calculated slope of the first line, as well. This may help ensure that the first and second secret geolocations were correctly submitted, rather than have the user get a couple lucky guesses. For example, the calculated angle θ may be obtained using many different combinations of two slope values. On the other hand, it is far less probabilistic that the user guessed values that created correct answers for both the secret angle θ and the slope of the first line, without knowing the actual answers to the challenge questions.

Figure 10:
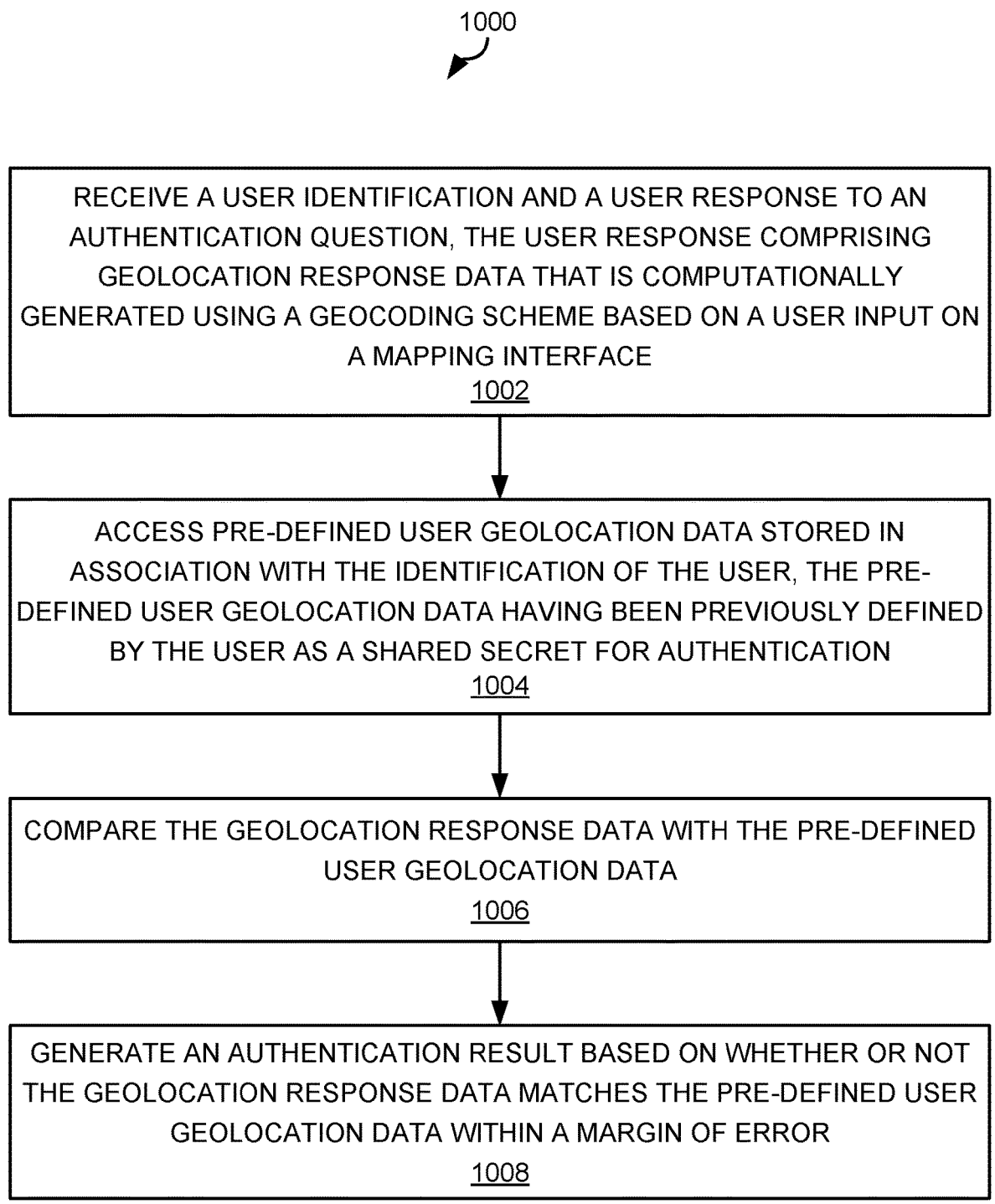
FIG. 10 illustrates an example of a method of authenticating a user.

FIG. 10 illustrates an example of a method 1000 of authenticating a user. At 1002, the method 1000 may include receiving a user identification and a user response to an authentication question, the user response comprising geolocation response data that is computationally generated using a geocoding scheme based on a user input on a map interface 172. For example, the geolocation response data may include response geolocation 220.

At 1004, the method 1000 may include accessing pre-defined user geolocation data stored in association with the identification of the user, the pre-defined user geolocation data having been previously defined by the user as a shared secret for authentication. For example, the pre-defined user geolocation data may include geolocation 204. At 1006, the method 1000 may include comparing the geolocation response data with the pre-defined user geolocation data. At 1008, the method 1000 may include generating an authentication result based on whether or not the geolocation response data matches the pre-defined user geolocation data within an acceptable range. The acceptable range may be defined by the acceptable range 210.

Figure 11:
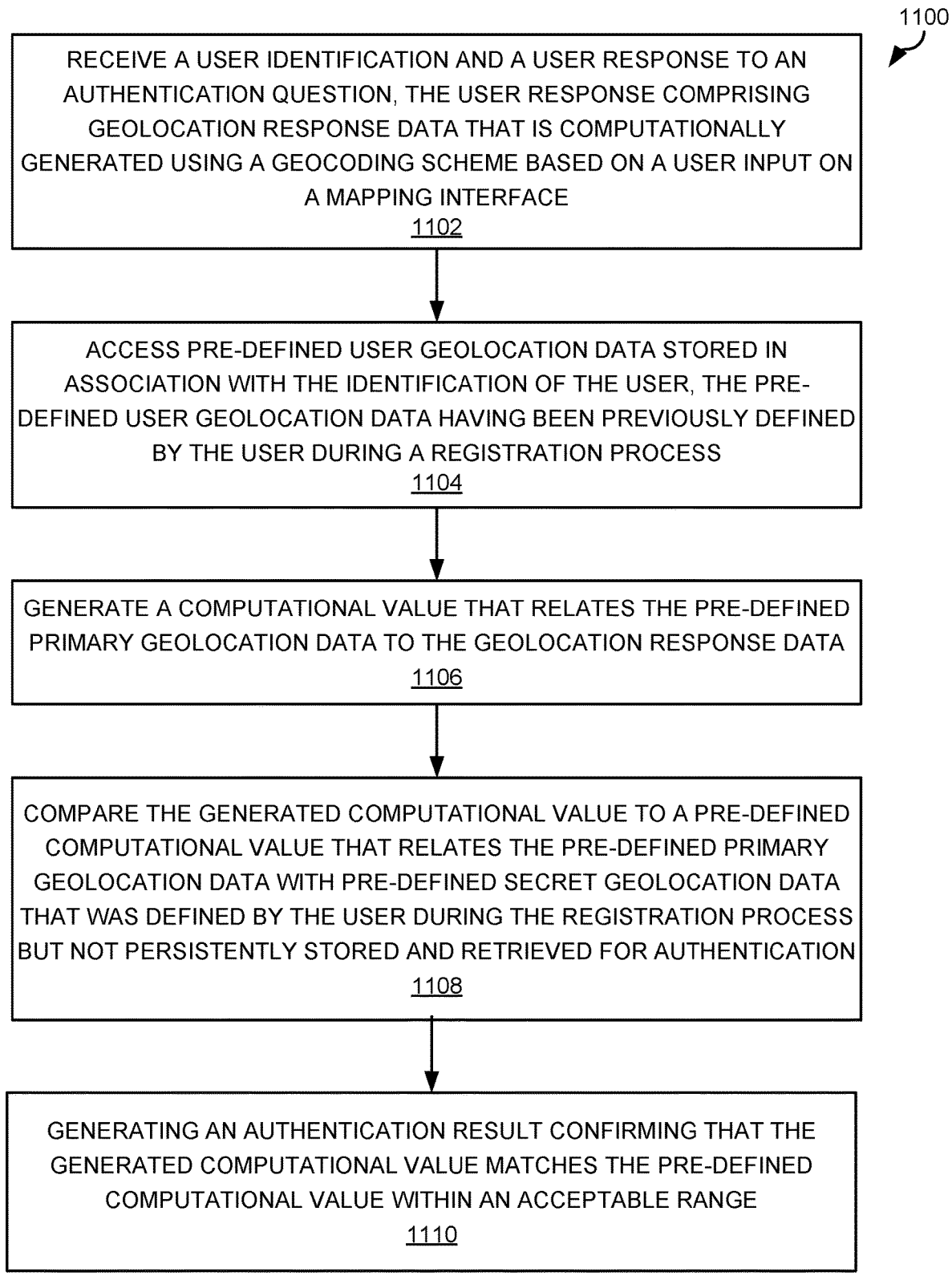
FIG. 11 illustrates an example of another method of authenticating a user.

FIG. 11 illustrates an example of another method 1100 of authenticating a user. At 1102, the method 1100 may include receiving a user identification and a user response to an authentication question, the user response comprising geolocation response data that is computationally generated using a geocoding scheme based on a user input on a map interface 172. For example, the geolocation response data may include geolocation 420.

At 1104, the method 1100 may include accessing pre-defined user geolocation data stored in association with the identification of the user, the pre-defined user geolocation data having been previously defined by the user during a registration process. For example, the pre-defined user geolocation data may include secret geolocation 410. At 1106, the method 1100 may include generating a computational value that relates the pre-defined primary geolocation data to the geolocation response data. For example, the generated computation value may include the slope value 425. At 1108, the method 1100 may include comparing the generated computational value to a pre-defined computational value that relates the pre-defined primary geolocation data with pre-defined secret geolocation data that was defined by the user during the registration process but not persistently stored and retrieved for authentication. For example, the pre-defined computation value may include the slope value 415, the pre-defined primary geolocation data may include primary geolocation 405, and the pre-defined secret geolocation data may include secret geolocation 410. At 1110, the method 1100 may include generating an authentication result confirming that the generated computational value matches the pre-defined computational value within an acceptable range.

Throughout the disclosure, the terms "a" and "an" may be intended to denote at least one of a particular element. As used herein, the term "includes" means includes but not limited to, the term "including" means including but not limited to. The term "based on" means based at least in part on.

The components of the system environment illustrated in FIGS. 7, 8 and 9 may be connected to one another via a communication network (not illustrated), which may include the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network through which system environment components may communicate.

The systems and processes are not limited to the specific embodiments described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather, the method blocks may be performed in any order that is practicable including simultaneous performance of at least some method blocks. Furthermore, each of the methods may be performed by one or more of the system components illustrated in the figures.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for authenticating a user, the method comprising:
   receiving a user identification and a user response to an authentication question, the user response comprising a geolocation input made via a map interface;
   generating user response data that is computationally generated using a geocoding scheme that obfuscates the geolocation input;
   accessing pre-defined user geolocation data stored in association with the user identification, the pre-defined user geolocation data having been previously generated based on a shared secret defined by the user for authentication;
   generating a computational value that relates the pre-defined user geolocation data to the user response data;
   comparing the generated computational value to a pre-defined computational value that relates the pre-defined user geolocation data with pre-defined secret geolocation data that was defined by the user but not persistently stored and retrieved for authentication, wherein the pre-defined computational value comprises a slope value of a line intersecting a pre-defined primary geolocation associated with the pre-defined primary geolocation data and a pre-defined secret geolocation associated with the pre-defined secret geolocation data;
   determining an amount of error between the generated computational value and the pre-defined computational value; and
   generating an authentication result based on whether or not the amount of error determined based on the geolocation response data is within an acceptable range.

2. The method of claim 1, further comprising:
   initiating a registration process of the user, comprising:
      receiving the authentication question;
      receiving the pre-defined user input geolocation, via the mapping interface, as an answer to the authentication question; and storing the authentication question and the pre-defined user input geolocation in association with the user identification.

3. The method of claim 1, further comprising:
determining a geographic area based on the acceptable range, the geographic area encompassing the pre-defined user input geolocation; and
wherein generating the authentication result comprises:
determining that the geolocation response data is within the geographic area.

4. The method of claim 3, wherein determining the geographic area comprises:
setting the acceptable range to a first value for a first level of authentication; and
setting the acceptable range to a second value for a second level of authentication, wherein the second value is smaller than the first value and the second level of authentication requires a higher level of accuracy than the first level of authentication, and wherein the geographic area varies based on a level of authentication to be used.

5. The method of claim 1, further comprising:
converting the pre-defined user geolocation data into a first unique geolocation string using a geocoding application program interface (API);
converting the geolocation response data into a second unique geolocation string using the geocoding API; and
storing the first and second unique geolocation strings.

6. An authentication system comprising:
at least one memory;
at least one authentication database coupled to the memory; and
at least one processor coupled to the memory and programmed to:
receive a user identification and a user response to an authentication question, the user response comprising a geolocation input via a map interface;
generate user response data that is computationally generated using a geocoding scheme that obfuscates the geolocation input;
access, from the at least one authentication database, pre-defined user geolocation data stored in association with the user identification, the pre-defined user geolocation data having been previously generated based on a shared secret defined by the user for authentication;
generate a computational value that relates the pre-defined user geolocation data to the user response data;
compare the generated computational value to a pre-defined computational value that relates the pre-defined user geolocation data with pre-defined secret geolocation data that was defined by the user but not persistently stored and retrieved for authentication, wherein the pre-defined computational value comprises a slope value of a line intersecting a pre-defined primary geolocation associated with the pre-defined primary geolocation data and a pre-defined secret geolocation associated with the pre-defined secret geolocation data;
determine an amount of error between the generated computational value and the pre-defined computational value; and
generate an authentication result based on whether or not the amount of error determined based on the geolocation response data is within an acceptable range.

7. The system of claim 6, wherein the at least one processor is further programmed to:
initiate a registration process of the user, comprising:
receiving the authentication question;
receiving the pre-defined user input geolocation, using the map application interface, as an answer to the authentication question; and
storing the authentication question and the pre-defined user input geolocation in association with the user identification.

8. The system of claim 6, wherein the at least one processor is further programmed to:
determine a geographic area based on the acceptable range, the geographic area encompassing the pre-defined user input geolocation; and
wherein to generate the authentication result, the at least one processor is further programmed to:
determine that the geolocation response data is within the geographic area.

9. The system of claim 8, wherein determining the geographic area comprises:
setting the acceptable range to a first value for a first level of authentication; and
setting the acceptable range to a second value for a second level of authentication, wherein the second value is smaller than the first value and the second level of authentication requires a higher level of accuracy than the first level of authentication, and wherein the geographic area varies based on a level of authentication to be used.

10. The system of claim 6, wherein the at least one processor is further programmed to:
convert the pre-defined user geolocation data into a first unique geolocation string using a geocoding application program interface (API);
convert the geolocation response data into a second unique geolocation string using the geocoding API; and
store the first and second unique geolocation strings in the authentication database.

11. A method for authenticating a user, the method comprising:
receiving a user identification;
receiving a user response to an authentication question, the user response comprising a geolocation input made via a map interface;
generate user response data that is computationally generated using a geocoding scheme that obfuscates the geolocation input;
accessing pre-defined primary geolocation data stored in association with the identification of the user, the pre-defined primary geolocation data having been previously defined by the user during a registration process;
generating a computational value that relates the pre-defined primary geolocation data to the geolocation response data, wherein generating the computational value comprises computing a slope value of a line intersecting a primary geolocation associated with the pre-defined primary geolocation data and a user inputted geolocation associated with the geolocation response data;
comparing the generated computational value to a pre-defined computational value that relates the pre-defined primary geolocation data with pre-defined secret geolocation data that was defined by the user during the registration process but not persistently stored and retrieved for authentication; and generating an authentication result confirming that the generated computational value matches the pre-defined computational value within an acceptable range.

12. The method of claim 11, wherein the user response is a first user response, the authentication question is a first authentication question, and the method further comprises:
receiving a second user response to a second authentication question prompting the user to input primary geolocation response data; and
comparing the primary geolocation response data with the primary geolocation data.

13. The method of claim 12, wherein the acceptable range is a first acceptable range, and wherein generating the authentication result further confirms that the primary geolocation response data matches the primary geolocation data to within a second acceptable range.

14. The method of claim 11, further comprising:
initiating a registration process of the user, comprising:
receiving the authentication question;
receiving the pre-defined secret geolocation data, using the map interface, as an answer to the authentication question;
computing the pre-defined computational value;
deleting or not storing the secret geolocation data; and
storing the authentication question and the pre-defined computational value in association with the user identification.

15. The method of claim 11, wherein the acceptable range is based on a level of authentication to be used among a range of levels of authentication, the range of levels of authentication comprising:
a first level of authentication; and
a second level of authentication, wherein the second level of authentication requires a higher level of accuracy than the first level of authentication.

16. The method of claim 11, wherein the user response is a first user response, the computational value is a first computational value, and the method further comprises:
receiving a second user response to a second authentication question, the second user response comprising second geolocation response data that is computationally generated using the geocoding scheme based on a second user input on the map interface;
generating a second computational value that relates the pre-defined primary geolocation data to the second geolocation response data;
generating a third computational value that relates the first computational value to the second computational value;
comparing the generated third computational value to a pre-defined computational value that relates the pre-defined primary geolocation data to both pre-defined first secret geolocation data and pre-defined second secret geolocation data that were both defined by the user during the registration process but neither was stored nor recorded; and
generating an authentication result confirming that the third generated computational value matches the pre-defined computational value within the acceptable range.

17. The method of claim 16, wherein:
the first computational value is a first slope value of a first line; and
generating the second computational value comprises computing a second slope value of a second line intersecting the primary geolocation associated with the pre-defined primary geolocation data and a user-inputted second geolocation associated with the second geolocation response data.

18. The method of claim 17, wherein generating the third computational value comprises computing an angle of intersection between the first line and the second line.

* * * * *